(12) United States Patent
Kelly, III et al.

(10) Patent No.: US 7,956,889 B2
(45) Date of Patent: Jun. 7, 2011

(54) VIDEO SURVEILLANCE SYSTEM

(75) Inventors: John J. Kelly, III, New Orleans, LA (US); J. Matthew Miller, III, Kenner, LA (US)

(73) Assignee: Model Software Corporation, New Orleans, LA (US)

( * ) Notice: Subject to any disclaimer, the term of this patent is extended or adjusted under 35 U.S.C. 154(b) by 2261 days.

(21) Appl. No.: 10/453,700

(22) Filed: Jun. 4, 2003

(65) Prior Publication Data

US 2004/0246336 A1    Dec. 9, 2004

(51) Int. Cl.
*H04N 7/18* (2006.01)

(52) U.S. Cl. ......................................... 348/143; 348/152

(58) Field of Classification Search .................. 348/143, 348/151–155, 169
See application file for complete search history.

(56) References Cited

U.S. PATENT DOCUMENTS

| | | | |
|---|---|---|---|
| 5,594,504 A * | 1/1997 | Ebrahimi | 375/240.16 |
| 5,604,537 A * | 2/1997 | Yamazaki et al. | 348/350 |
| 5,613,039 A | 3/1997 | Wang et al. | |
| 5,774,569 A | 6/1998 | Waldenmaier | |
| 5,850,472 A | 12/1998 | Alston et al. | |
| 5,930,379 A | 7/1999 | Rehg et al. | |
| 5,969,755 A | 10/1999 | Courtney | |
| 5,987,154 A | 11/1999 | Gibbon et al. | |
| 6,049,619 A | 4/2000 | Anandan et al. | |
| 6,075,557 A | 6/2000 | Holliman et al. | |
| 6,075,895 A | 6/2000 | Qiao et al. | |
| 6,081,606 A | 6/2000 | Hansen et al. | |
| 6,359,647 B1 | 3/2002 | Sengupta et al. | |
| 6,381,374 B1 * | 4/2002 | Pourjavid | 382/275 |
| 6,625,310 B2 * | 9/2003 | Lipton et al. | 382/173 |
| 6,654,481 B2 | 11/2003 | Amemiya et al. | |
| 6,661,457 B1 * | 12/2003 | Mathur et al. | 348/273 |
| 6,665,004 B1 | 12/2003 | Paff | |
| 6,674,896 B1 * | 1/2004 | Torre-Bueno | 382/162 |
| 6,677,959 B1 * | 1/2004 | James | 345/660 |
| 6,678,413 B1 * | 1/2004 | Liang et al. | 382/181 |
| 6,680,748 B1 * | 1/2004 | Monti | 348/220.1 |
| 6,876,384 B1 * | 4/2005 | Hubina et al. | 348/223.1 |
| 6,906,745 B1 * | 6/2005 | Fossum et al. | 348/229.1 |
| 6,950,123 B2 | 9/2005 | Martins | |

(Continued)

OTHER PUBLICATIONS

Dorin Comaniciu et al., "Distribution Free Decomposition of Multivariate Data", Pattern Analysis & Applications (1999) pp. 2:22-30, 1999 Springer-Verlag Lundon Limited.

(Continued)

*Primary Examiner* — David Czekaj
(74) *Attorney, Agent, or Firm* — Buchanan Ingersoll & Rooney PC

(57) ABSTRACT

Viewing a three dimensional area from numerous camera angles at different exposures using intensity and chromaticity data at the different exposures to create a pixel model for each pixel. A current image is compared with the background model to find pixels that have changed from their pixel model. These novel pixels are processed using contiguous region detection and grouped into foreground figures. For each camera, software extracts features from each foreground figure. A central processor maintains an object model for each foreground figure. A graphical user interface displays the relative locations of foreground figures in a world model. The location and identification of the foreground figures is checked against a table of permissions so as to selectively generate an alert. If a figure leaves or is about to leave a cell, the invention accounts for its approximate position and notifies adjacent cells of the expected arrival of the foreground figure.

73 Claims, 12 Drawing Sheets

U.S. PATENT DOCUMENTS

| | | | |
|---|---|---|---|
| 6,985,620 B2 | 1/2006 | Sawhney et al. | |
| 7,015,955 B2 * | 3/2006 | Funston et al. | 348/223.1 |
| 7,099,056 B1 * | 8/2006 | Kindt | 358/509 |
| 7,110,569 B2 | 9/2006 | Brodsky et al. | |
| 7,184,054 B2 * | 2/2007 | Clark | 345/589 |
| 7,190,809 B2 * | 3/2007 | Gutta et al. | 382/103 |
| 7,260,241 B2 | 8/2007 | Fukuhara et al. | |
| 7,292,264 B2 | 11/2007 | Itokawa | |
| 7,296,286 B2 * | 11/2007 | Osawa | 725/105 |
| 7,362,365 B1 * | 4/2008 | Reyneri et al. | 348/308 |
| 7,382,397 B2 | 6/2008 | Mottur | |
| 2002/0064382 A1 | 5/2002 | Hildreth et al. | |
| 2003/0007074 A1 | 1/2003 | Nagaoka et al. | |
| 2008/0030579 A1 | 2/2008 | Kelly, III et al. | |
| 2008/0211907 A1 | 9/2008 | Kelly et al. | |

OTHER PUBLICATIONS

Thanarat Horprasert et al., "A Robust Background Subtraction and Shadow Detection", Computer Vision Laboratory, University of Maryland, College Park, MD, Jan. 2000, 6 pages.

Chris Stauffer et al., "Adaptive Background Mixture Models for Real-Time Tracking", The Artificial Intelligence Laboratory, Massachusetts Institute of Technology, Cambridge, MA, 1999, 7 pages.

W.E.L. Grimson et al., "Using Adaptive Tracking to Classify and Monitor Activities in a Site", Artificial Intelligence Laboratory, Massachusetts Institute of Technology, Cambridge, MA, 1998, pp. 1-8.

* cited by examiner

VIDEO SURVEILLANCE SYSTEM

BACKGROUND

The invention relates to video surveillance systems and, more particularly, to a method and apparatus for tracking motion in a three dimensional space in video surveillance systems.

In an era of increasing fear of terrorism and corporate scandal, video surveillance has become an increasingly essential part of security. While surveillance cameras can be useful in recording wrongdoings, their greater value is realized when they prevent such acts.

Generally speaking, fixed cameras provide video surveillance for a spatially limited area. As the size of the area increases, the number of cameras that are needed for a given level of surveillance also increases. For instance, using fixed cameras to survey the border between two nations might require thousands of cameras. The same could be true for protecting a large corporation. While most office buildings do not require thousands of cameras for adequate surveillance, tens or hundreds may be needed.

A source of problems with the prior art is that security personnel are required to monitor these cameras either in real time or during replay. There are limits on how many cameras an individual can watch at an acceptable level of efficiency. For instance, studies have shown that an average person can only watch four to five cameras at an acceptable level of efficiency.

Most surveillance really only concerns moving objects. The signal processing of video images generally and, more specifically, for identifying moving objects, is not new. For example, U.S. Pat. No. 5,930,379 discloses modeling an object as a branched kinematic chain composed of links connected at joints. Groups of pixels having like motion parameters are assigned to the links. Motion parameters are estimated until the groups of pixels and their motion parameters converge and can be identified with the moving object.

U.S. Pat. No. 5,987,154 discloses detecting a moving object, calculating the local extremes of curvature of the boundaries of the moving object, comparing the local extremes with a stored model of a human head in order to find regions shaped like a human head, and identifying the head with a surrounding shape.

U.S. Pat. No. 6,049,619 discloses a stratified moving object detection technique which gradually increases in complexity as scene complexity increases (from least complex to most complex): (i) scenarios in which the camera induced motion can be modeled by a single two-dimensional parametric transformation, (ii) those in which the camera induced motion can be modeled in terms of a small number of layers of parametric transformations, and (iii) general three-dimensional scenes, in which a more complete parallax motion analysis is required.

U.S. Pat. No. 6,081,606 discloses processing a sequence of images and generating a flow field representing the motion within a scene. The flow field is a vector representation of the motion of the scene that represents both the magnitude and the direction of the motion. The flow field is generated by correlating at least two frames in the sequence of images. This flow field is analyzed by a flow field segmentor to determine the magnitude and direction of motion within the scene and segment the motion information from the static portions of the scene. An alarm detector then processes the motion information to determine if an alarm should be generated based upon the motion information.

U.S. Pat. Nos. 6,188,777 and 6,445,810 disclose marking and tracking regions of homogenous color. In one approach, each image received at a primary camera is initially represented with pixels corresponding to the red, green, and blue channels of the image, and is converted into a "log color-opponent" space. This space can represent the approximate hue of skin color, as well as its log intensity value. More specifically, (R, G, B) tuples are converted into tuples of the form (l(G), l(R)−l(G), l(B)−(l(R)+l(G))/2), where l(x) indicates a logarithm function. In another approach, a lookup table is precomputed for all input values, quantizing the classification score (skin similarity value) into 8 bits and the input color channel values to 6, 7, or 8 bits.

U.S. Pat. No. 6,504,951 discloses classifying potential sky pixels in the image by color, extracting connected components of the potential sky pixels, eliminating ones of the connected components that have a texture above a predetermined texture threshold, computing desaturation gradients of the connected components, and comparing the desaturation gradients of the connected components with a predetermined desaturation gradient for sky to identify true sky regions in the image.

Comaniciu et al., "Distribution Free Decomposition of Multivariate Data," Pattern Analysis & Application, 2:22-30 (1999) discloses using a mean shift technique to decompose multivariate data. An iterative technique along with density estimate functions are used to reduce a large dataset to the few points that best describe the data.

Grimson et al., "Using Adaptive Tracking to Classify and Monitor Activities in a Site," Proceedings IEEE Conference on Computer Vision and Pattern Recognition, pp. 22-31, (1998) discloses using camera coordinates of objects that pass through the fields of view of cameras, along with time, to find correspondences between the cameras. Once all the camera views are mapped onto one camera view, this mosaic camera view can be mapped onto a virtual overhead plane. Coordinates in the virtual overhead plane are used to track moving objects.

Horprasert et al., "A Robust Background Subtraction and Shadow Detection," Proceedings of the Asian Conference on Computer Vision, Taipei, Taiwan (January 2000) discloses using chromaticity data separate from intensity data to do background subtraction. All colors are treated as being on a line in a three dimensional space. The difference between two colors is calculated as the distance between their color lines.

Stauffer et al., "Adaptive Background Mixture Models for Real-Time Tracking," Proceedings IEEE Conference on Computer Vision and Pattern Recognition, pp. 246-252 (1999) discloses performing background subtraction with models that change over time. More specifically, each pixel is represented by multiple Gaussian distributions.

None of these documents describe a technique for monitoring multiple cameras with fewer personnel and/or at greater efficiency by electronically filtering and alerting personnel as to which cameras show unauthorized activity and, more importantly, relieving personnel from some monitoring authorized activity as is described below.

SUMMARY

The invention involves viewing a three dimensional space from numerous camera angles at different exposures. The invention uses intensity and chromaticity data at the different exposures to create a pixel model for each pixel. These pixel models form the basis for a background model. A current image is compared with the background model to find pixels that have changed from their pixel model. These novel pixels are processed using contiguous region detection and grouped into foreground figures. For each camera, features are extracted from each foreground figure. These features are then placed in a queue with features from other cameras and sent to a central processor.

The central processor maintains an object model for each foreground figure. The central processor also maintains a world model. The world model is based upon the background models and each of the object models. Once the central processor has processed the features from a particular foreground figure, the central processor compares the features with the object models in the world model. If the features match one of the pre-existing object models, the central processor updates the corresponding object model. If not, the central processor adds a new object model to the world model.

A graphical user interface displays the relative locations of foreground figures in the world model. The location and identification of the foreground figures is checked against a table of permissions so as to selectively generate an alert. The graphical user interface also provides for real-time viewing and manual identification of the foreground figures.

Camera video can be analyzed in a cellular strategy. If a figure leaves or is about to leave a cell, the preferred embodiment accounts for its approximate position and notifies adjacent cells of the expected arrival of the foreground figure. The system maintains local and global object identifications (ids) for each figure. If a new figure enters the area, an assertion is made that the global id and the local id are the same. If an object in a cell is determined to be the same object as an object from another cell, the two objects are connected (or associated together) and are given the same global id.

The invention can be advantageous in that the pixel models are able to account for overexposed and underexposed pixels, changes in lighting, repetitive motion, and other causes of false alarms.

The invention can be advantageous in that it is possible to record changes to the world model rather than pixel changes. In other words, a more sophisticated method of reasoning about the world allows for more concise storage of the fact that an event occurred. This allows the invention to require less storage space to store the similar information. Also, this allows the invention to use less bandwidth to transfer information to another point. Less storage space is required because in preferred embodiments, changes in the world model are stored, rather than storing changes to successive images in a video stream. Also, the selection of which images are stored can be more appropriate because it can be in terms of easier-to-express and understand descriptions of impermissible changes in a world model, rather than pixel changes in images. Further, less bandwidth is required because a world model is used, rather than successive images in a video stream. This affords a more succinct representation.

The invention can be advantageous in that it is able to generate fewer false alarms because the alarms are based on changes to the world model rather than pixel changes. More specifically, depending on implementation, a user is likely to experience fewer false positives and/or false negative alert conditions because the user can better establish criteria as to what should cause the user to be notified in terms of changes with respect to a world model, rather than pixel changes in an image stream. This is in contrast to systems that compress images both spatially and temporally in the image domain (e.g., MPEG). This other systems might express an alarm condition in terms of a 2-D sub-image, which moves in a certain direction in part of an image. This is a contrast to the inventor's preferred implementation of combining a variable image into a world model and then storing, searching, generating alarms and transmitting image information in terms with respect to that world model.

Another advantage of a preferred embodiment is that is possible to track individual objects that are within the view of one or more cameras and then hand-off the object from one cellular group of cameras to a neighboring video cell.

Another advantage of a preferred embodiment is that it is possible to distinguish any object that violates a rule of security, safety, or otherwise by its location, velocity, acceleration, path, or any combination of present or historical data.

Another advantage of a preferred embodiment is that is possible to view a single graphical interface rather than a large number of monitors.

Another advantage of a preferred embodiment is that it is possible to manually or automatically view any object as it moves from one camera view to the next.

Another advantage of a preferred embodiment is to view a selected object from all or more than one simultaneously available camera view.

BRIEF DESCRIPTION OF THE DRAWINGS

The foregoing, and other objects, features, and advantages of the invention will be more readily understood upon reading the following detailed description of exemplary embodiments in conjunction with the drawings in which.

DETAILED DESCRIPTION

In the following description, specific details are discussed in order to provide a better understanding of the invention. However, it will be apparent to those skilled in the art that the invention can be practiced in other embodiments that depart from these specific details. In other instances, detailed descriptions of well-known methods are omitted so as not to obscure the description of the invention with unnecessary detail.

Figure 1:
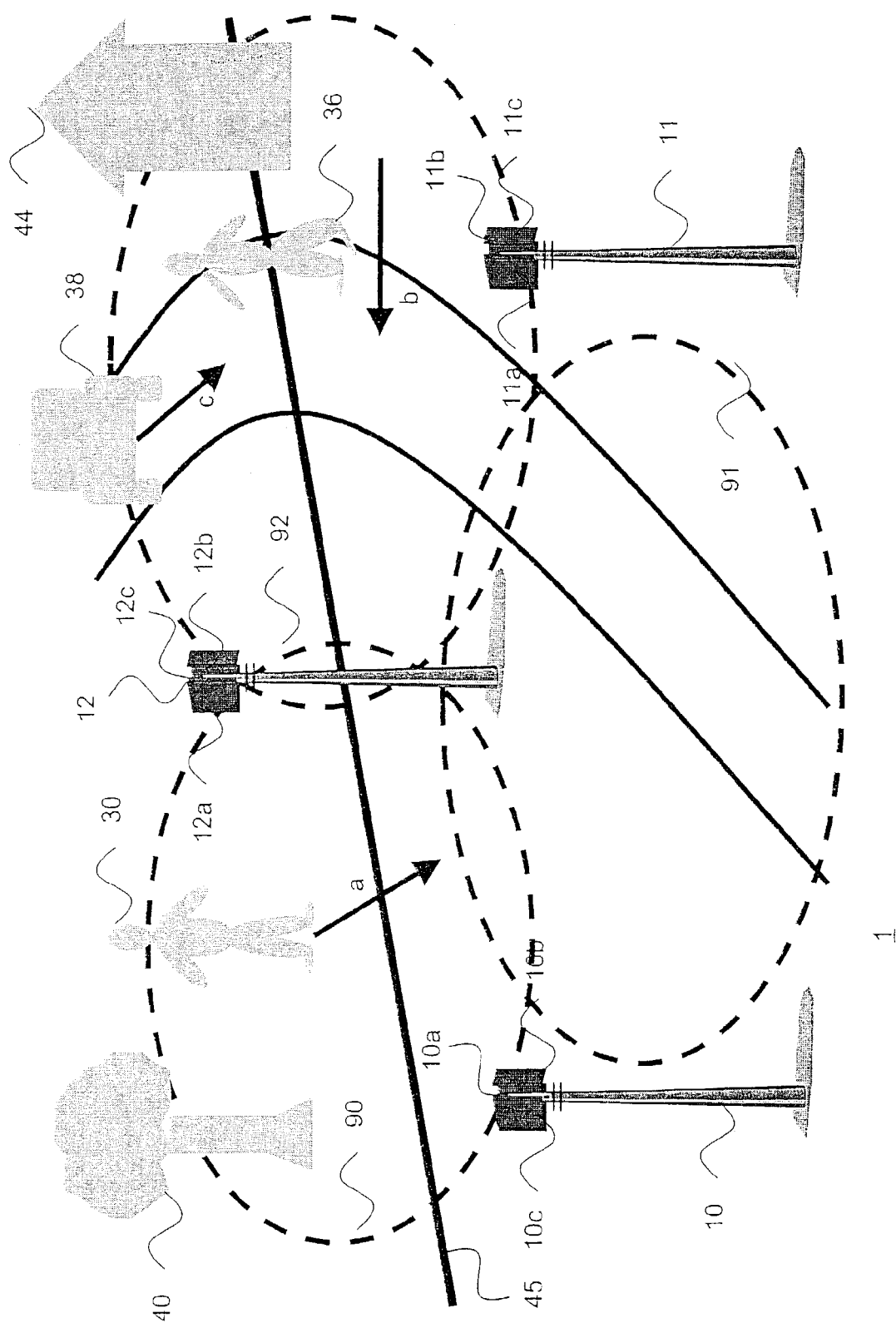
FIG. 1 is an illustration of a three dimensional area with video surveillance cameras arranged in a cellular format.

Referring now to the drawings, FIG. 1 is an illustration of a three dimensional area with video surveillance cameras arranged in a cellular format. A three dimensional area 1 is divided into, for example, three adjacent video cells 90, 91, and 92. Many more video cells would likely be employed in a practical implementation. The cells 90, 91, and 92 may or may not overlap depending on the specific implementation of a system. While an outdoor setting is pictured, the cells 90, 91, and 92 may correspond to different parts (hallways, rooms, open areas, etc.) of any building (home, office, museum, sports arena, public, military, or private facility, etc.).

A first camera station 10 has one or more cameras. These cameras may have a fixed view or be remotely controlled. In addition, they may have a fixed location or be mobile. In either case, the location and/or perspective of a particular camera is either known or calculated from sensor data and/or image analysis.

In FIG. 1, a first camera 10a is positioned so as to view a first cell 90; a second camera 10b is positioned so as to view a second cell 91; and a third camera 10c is positioned so as to view another cell (not shown), etc. Similarly, at camera station 11, there is a first camera 11a for viewing the second cell 91 cell and a second camera 11b for viewing a third cell 92. At camera station 12, there are three cameras 12a-c for viewing the three cells 90, 91, and 92, respectively.

As discussed in more detail below, different cameras (e.g., 10a and 12a) view different surfaces of the same volume (e.g., cell 90) of the three dimensional space 1. The output signals of these cameras are then processed to create pixel models that are used to produce a background model of the three dimensional space 1. This background model is used to differentiate foreground figures from the background (i.e. what is normally there).

In FIG. 1, stationary or permanent objects such as the tree 40 and the building 44 become part of the background. While the tree 40 may include swaying branches and building 44 may include swinging doors or a flag blowing in the wind, these objects are treated as part of the background. Once the background model is complete, a process of background subtraction is performed to obtain pixels that have changed.

In FIG. 1, foreground FIGS. 30, 36, and 38 are moving in directions a, b, and c, respectively. As these foreground figures move, they cause pixels to change. These novel pixels are then processed using contiguous region detection.

Figure 2:
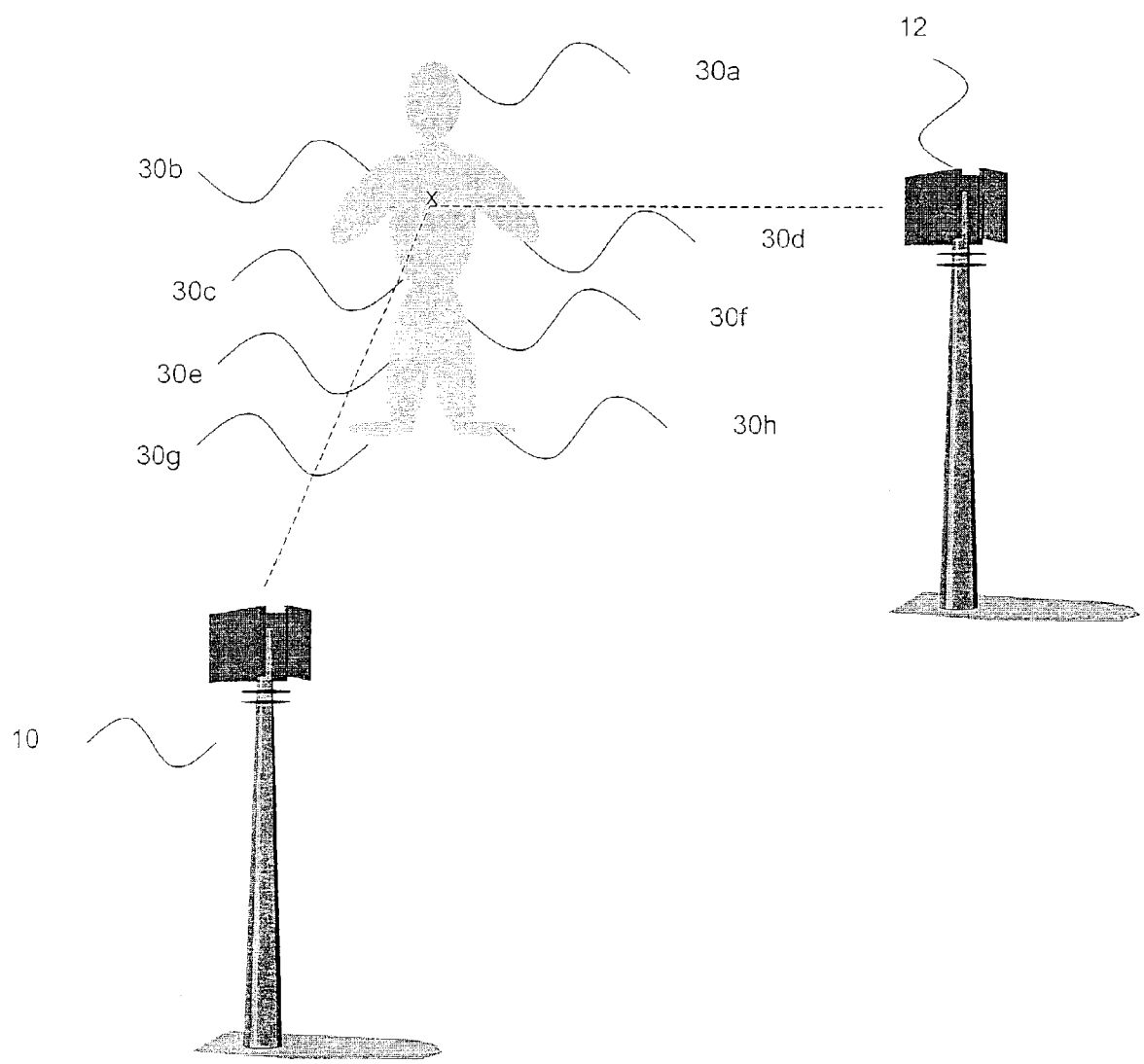
FIG. 2 is a more detailed view of a foreground figure.
Figure 3:
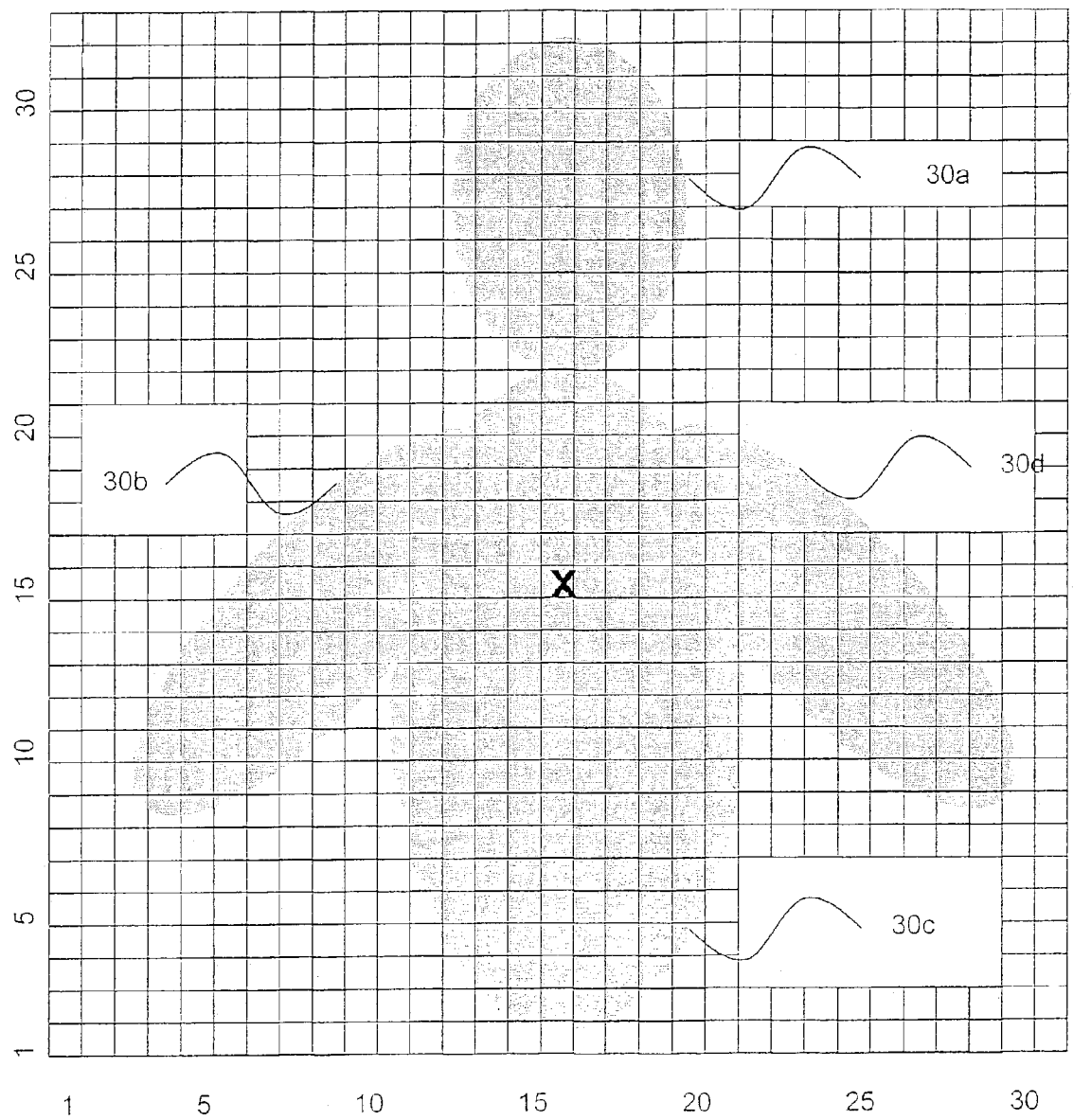
FIG. 3 is an even more detailed view of the foreground figure.

FIG. 2 is a more detailed view of foreground FIG. 30. The foreground FIG. 30 is viewed by two cameras 10a and 12a. FIG. 3 is an even more detailed view of foreground FIG. 30. Once foreground FIG. 30 is identified and processed, it is possible to calculate the intersection of vectors in real space so as to calculate the approximate location of FIG. 30. Those skilled in the art recognize that there are many factors involved in properly discerning foreground figures. For example, lighting changes can cause pixels to be either under or overexposed. When this happens, what was learned as a background may not work. In addition, leaves blowing in the wind, waves lapping on a beach, or clouds passing in front of the sun may create the false impression of a foreground object. Techniques discussed below in connection with FIGS. 4-8 overcome these and other challenges involved in doing background subtraction.

Figure 4:
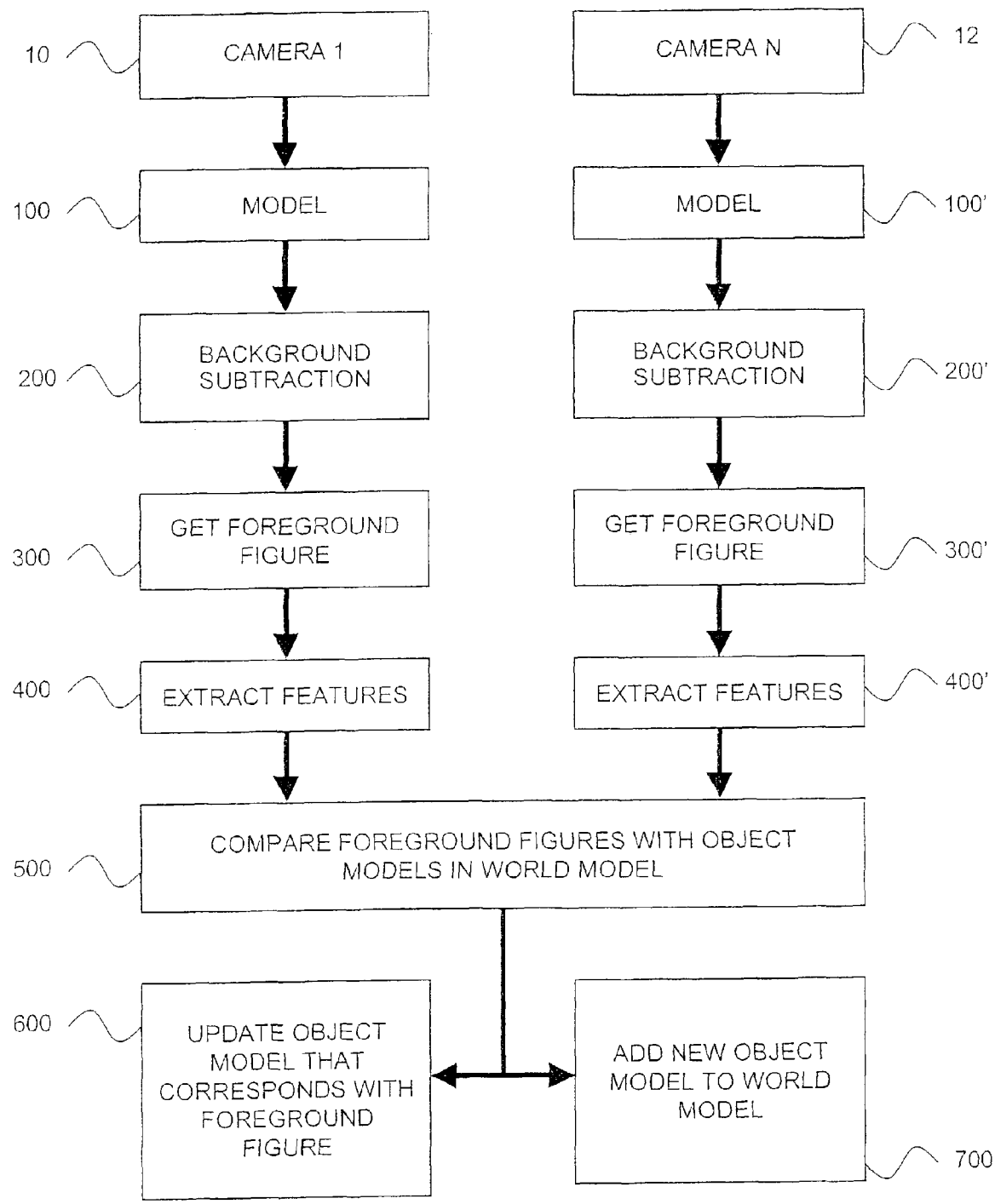
FIG. 4 is a high-level flow chart of a method for video surveillance in accordance with the invention.

FIG. 4 is a high-level flow chart of a method for video surveillance in accordance with the invention. As described above, two or more cameras view different surfaces of the same volume of a three-dimensional space. Each camera stores chromaticity and intensity data for multiple images at multiple exposures. This function is performed, for example, by a local processor, local ASIC, or a centrally located server.

In step 100, the chromaticity and intensity data is used to model the three-dimensional area and create a background model. More specifically, each camera analyzes the chromaticity and intensity date to create a pixel model for each pixel. These pixel models form the basis for the background model.

In step 200, a current image is compared with the background model to find pixels that have changed from their pixel model. While a pixel may have changed, if it is consistent with its pixel model (i.e. it has not changed beyond a certain threshold), this pixel is included in the model and "turned off." If on the other hand, the pixel is inconsistent with its pixel model, this pixel is treated as a novel pixel and "turned on."

In step 300, adjacent novel pixels are grouped into foreground figures as described in more detail below.

In step 400, each camera extracts features from each foreground figure. These features are then placed in a queue with features from other cameras.

In step 500, a central processor (or in some cases, the same processor) processes the queue of features. If multiple cameras are viewing the same foreground figure, the central processor should receive at least one feature from each camera. While it is possible to synchronize the cameras, it is not necessary. If, for example, each camera identifies each feature with a particular moment in time, the central processor can process the features accordingly. For example, the central processor can prioritize the image frames based upon time. If so, the central processor can collect all features from multiple images from multiple cameras, reorder the images, then process all the features from each image as a group. The fact that the features in the group are not from the same instant in time is accounted for as described below.

As the central processor processes features from the input cameras, the central processor maintains an object model for each foreground figure. The central processor also maintains a world model. The world model is based upon the background models and each of the object models.

Once the central processor has processed the features for a particular foreground figure, the central processor compares the features with the object models in the world model.

If it is determined that the features match one of the pre-existing object models, the central processor updates the corresponding object model in step 600. For example, the central processor updates the position of the object model and/or adds additional details.

If on the other hand, the central processor determines that the features do not match any of the pre-existing object models, the central processor adds a new object model to the world model in step 700 based upon the currently known information.

Figure 5:
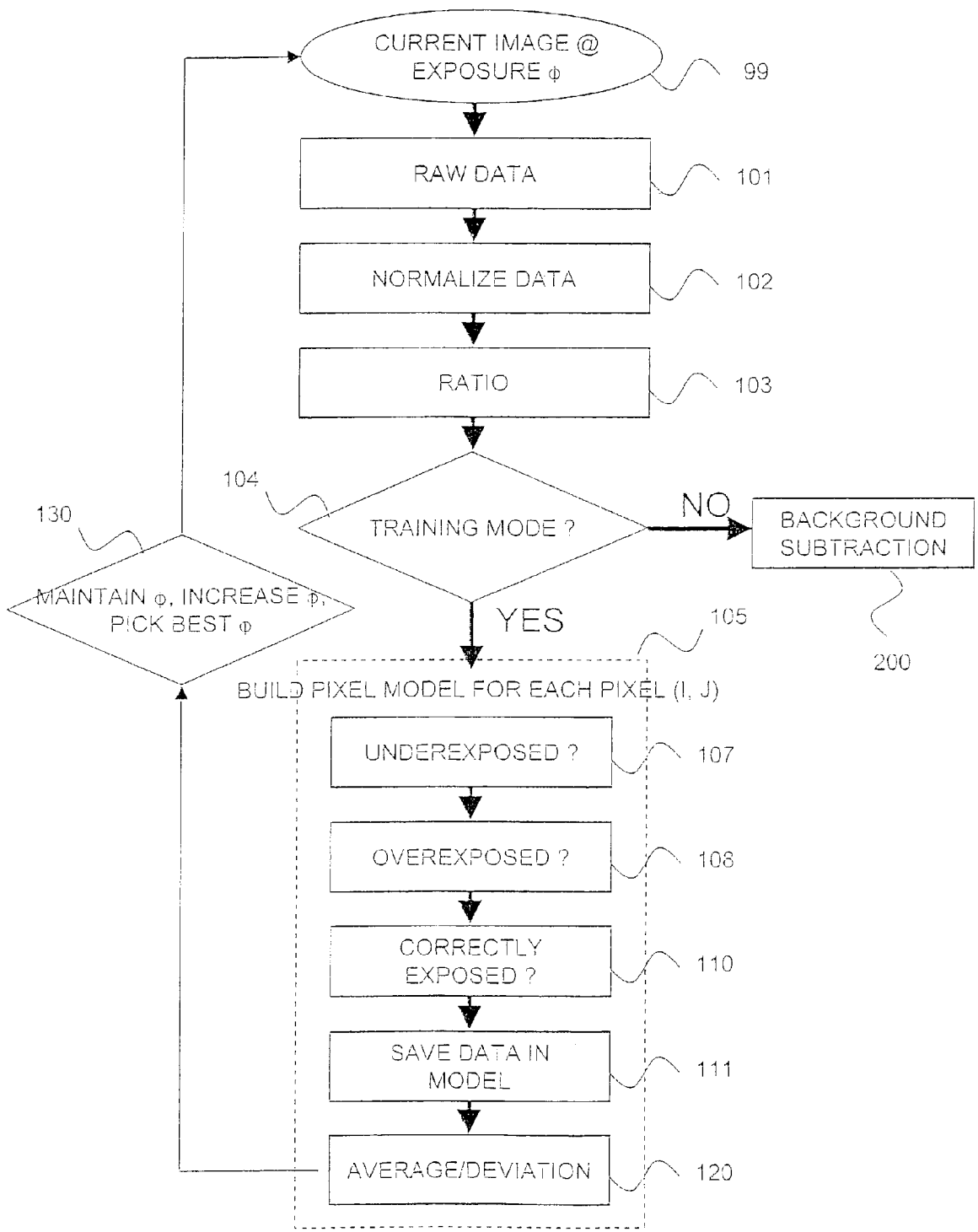
FIG. 5 is a more detailed view of the step of creating a background model.

Referring now to FIG. 5, the step of creating a background model 100 is described in more detail. As shown in step 99, a camera records an input image at a current exposure. The number of pixels in the input image depends on the resolution of the camera.

In step 101, the red, green, and blue intensity of each pixel is stored.

In step 102, the red, green, and blue intensity of each pixel is normalized based upon the current exposure and gain settings.

In step 103, color ratios are calculated for each pixel. The color ratios are the measured value of one color divided by the measured value of another color. According to an exemplary embodiment, the ratios of red-to-green and blue-to-green are calculated and these ratios are used to measure chromaticity. However, it will be evident to those skilled in the art that other ratios or other methods of measuring chromaticity can be used.

In step 104, it is determined whether or not the system is in training mode. If so, the system begins to or continues to build a pixel model for each pixel. If not, the system proceeds to background subtraction. While FIG. 5 shows the steps of building a pixel model 105 and background subtraction 200 as being mutually exclusive, it is possible to continuously update the model while performing background subtraction.

In step 107, the current red, green, and blue intensity values for each pixel are compared to an underexposed threshold. The underexposed threshold is the point at which is either impossible or too computationally expensive to tell what the actual intensity is because there is too much noise relative to the measured "signal" of light intensity.

In step 108, the current pixel values are compared to an overexposed threshold. The overexposed threshold is determined by the point at which exposure no longer increases linearly with a linear increase in light intensity (without gamma correction).

In step 110, it is determined whether the current pixel values are normally (or correctly) exposed. A pixel is correctly exposed if it is not underexposed or overexposed.

In step 111, data is saved in pixel model (i, j), and in steps 107, 108 and 110, the total number of times that a given pixel value for pixel (i, j) is overexposed, underexposed, or correctly exposed is counted. For example, if the red intensity value for pixel (i,j) is correctly exposed, the red intensity value is saved in pixel model (i, j) and the total number of times that the red value for pixel (i, j) is correctly exposed is increased by one. Similarly, if the green intensity value for pixel (i, j) is correctly exposed, the green intensity value is saved in the model and the total number of times that green is correctly exposed is also increased by one. If, however, the blue intensity is underexposed, the blue intensity value is not saved in the model and the total number of times that the blue value for pixel (i, j) is underexposed is increased by one. Because the red and green values for pixel (i, j) are correctly exposed, the red-to-green ratio is also saved in pixel model (i, j). However, because the blue value for pixel (i, j) is incorrectly exposed, the blue-to-green ratio is not saved in pixel model (i, j).

In step 120, the average (and the standard deviation) of each pixel value stored in pixel model (i, j) is updated. For example, if red, green, and blue intensity values and red-to-green and blue-to-green ratios are stored in pixel model (i, j), the system calculates the average (and the standard deviation) of:
(1) all the red intensity values in pixel model (i, j);
(2) all the blue intensity values in pixel model (i, j);
(3) all the green intensity values in pixel model (i, j);
(4) all the red-to-green ratios in pixel model (i, j); and
(5) all the blue-to-green ratios in pixel model (i, j).

After calculating standard deviation and average in the previous paragraph, another part of step 120 is to adjust average and standard deviation if the data is determined to be near either edge of the range of values that are collectable by the image sensor. In other words, there needs to be an adjustment if the data is very close to the minimum value detectable or if the data is very close to the maximum value detectable without being overexposed. For this purpose, the following values are used:
(1) Sigma.pixel is the standard deviation as measured for a given pixel;
(2) Sigma.camera is the "known" standard deviation of a normal pixel as a function of a given camera system (i.e., lens, imager);
(3) Nu.Max is the underexposed threshold normalized to the maximum exposure and gain at which the camera trains; and
(4) No.Min is the overexposed threshold normalized to the minimum exposure and gain at which the camera trains.

A value is considered to be near one of the thresholds if:
(a) $N_{avg}+3.5\text{sigma.pixel}<\text{Nu.Max}+3.5\text{sigma.camera}$, or
(b) $N_{avg}-3.5\text{sigma.pixel}>\text{No.Min}-3.5\text{sigma.camera}$, in one example.

If (a) is true, then $N_{avg}$ is changed to be equal to $N_{avg}+3.5\text{sigma.pixel}-3.5\text{sigma.camera}$, and sigma.pixel is set to sigma.camera. However, if (b) is true, then $N_{avg}$ is changed to be equal to $N_{avg}-3.5\text{sigma.pixel}+3.5\text{sigma.camera}$, and sigma.pixel is set to sigma.camera. Basically, the idea is that if the collected average is very close to the minimum or maximum normalized values that the camera can see, then correct data was most likely not collected, so the average and standard deviation are slightly adjusted for better results.

Those skilled in the art will appreciate that repetitive motion (such as leaves blowing in the wind or waves lapping on a beach) will lead to a larger standard deviation. While FIG. 5 illustrates updating the average (and the standard deviation) of each pixel value each time the training process is performed, it may be preferably to perform this calculation at the end of the training process. It is also possible to have multiple models per pixel or to have multiple pixels represented by the same model.

In step 130, the current exposure is maintained; the current exposure is incrementally increased (or decreased); or the best exposure is selected depending on the training process. For example, in an exemplary embodiment, the training process is performed one hundred twenty-five times. The first twenty-five images are recorded at an exposure time of 20 milliseconds. The next fifteen images are recorded at an exposure time of 25 ms. After which groups of fifteen images are recorded at exposure times of 30 ms, 40 ms, and 45 ms. Finally, twenty-five images are recorded at an exposure time of 50 ms. Obviously, the twenty-five images recorded at an exposure time of 20 ms are more likely to be underexposed. And the twenty-five images recorded at 50 ms are more likely to be overexposed. However, those skilled in the art will appreciate it is advantageous to record that more images at the lowest and highest exposures. Some pixels will only be normally exposed at either the lowest or highest exposure settings, and therefore, they will be on the "border" between normally exposed and incorrectly exposed. More images should be taken to get enough samples of a given pixel to assure that a normally exposed sample is acquired for that pixel.

As discussed above, the total number of underexposed values, overexposed values, and correctly exposed values is counted. Therefore, for a given intensity or ratio, the maximum number of correctly exposed values is one hundred twenty-five in this example. In some cases, there may not be any correctly exposed values. At the end of the training process, the best exposure time for the image (i.e. the collective best exposure time for all of the pixels) is continually sought through an auto-exposure algorithm.

Figure 6:
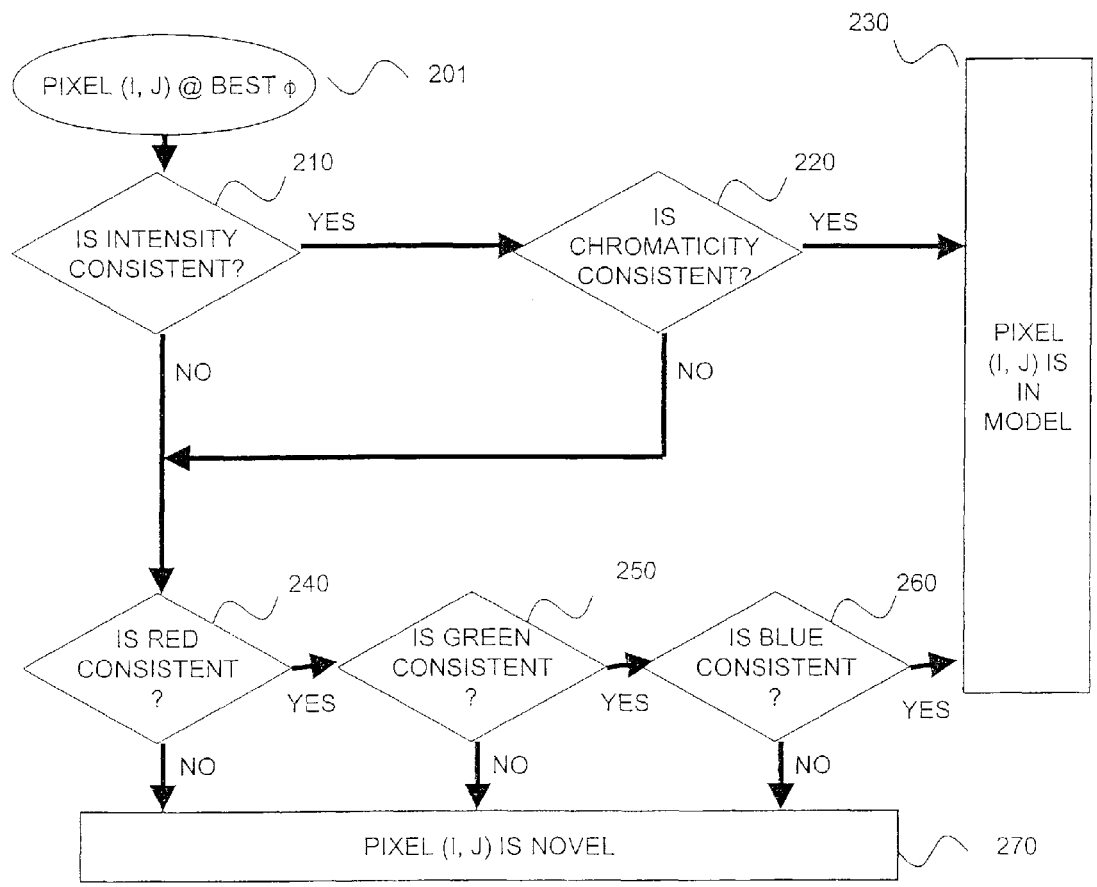
FIG. 6 is a more detailed view of the step of background subtraction.

Referring now to FIG. 6, the step of background subtraction 200 is described in more detail. As explained above, at the end of the training process, the best exposure time is selected. Therefore, in step 201, the input to the background subtraction process is a current image at the best exposure. The number of pixels in the current image depends on the resolution of the camera.

As will be demonstrated below, the step of background subtraction 200 electronically filters the current image to leave only novel pixels. In a less complex system, the step of background subtraction may be limited to, for example, step 210 or a variation thereof. There can be additional safeguards to prevent false alarms.

In step 210, it is determined whether the overall intensity of pixel (i, j) is consistent with pixel model (i, j). The overall intensity of pixel (i, j) may, for example, be the sum of the red, blue, and green intensities of pixel (i, j). As described above, in relation to step 126, the average of each pixel value stored in pixel model (i, j) is calculated. If, for example, the system stored the average red intensity value, the average blue intensity value, and the average green intensity value, the expected overall intensity would be the sum of these three averages. If, for example, the overall intensity of pixel (i, j) is greater than half the expected intensity and less the twice the expected intensity, pixel (i, j) is consistent with the model. If the overall intensity of pixel (i, j) is less than half the expected intensity or greater than twice the expected intensity, pixel (i, j) is inconsistent with the model. Of course, it is possible to make the system more (or less) sensitive by using a narrower (or wider) window of acceptable values.

If the overall intensity of pixel (i, j) is within an acceptable window of values, the system proceeds to step 220 to check chromaticity. If not, the system proceeds to step 240. In a less complex system, pixel (i, j) may be treated as a novel pixel. Additional steps can be performed to determine to greater degree if pixel (i, j) is an acceptable pixel.

In step 220, it is determined whether the chromaticity of pixel (i, j) is consistent with pixel model (i, j) as described in more detail below. If so, the system can proceed to step 230. If not, the system should proceed to step 240.

In step 230, it has been determined that pixel (i, j) is consistent with both the overall intensity part of the pixel model and the chromaticity part of the pixel model. Therefore, pixel (i, j) can be ignored and treated as part of the model. Once it has been determined that pixel (i, j) is part of the model, the next pixel in the current image can be processed starting from step 201 until there are no pixels left.

If on the other hand, it is determined that pixel (i, j) is inconsistent with the model, the pixel can be treated as a novel pixel or additional processing can be performed as described below.

In step 240, the red intensity value is individually analyzed. If the red intensity value is consistent with the pixel model, the system proceeds to step 250. If not, pixel (i, j) is treated as novel and the system can process the next pixel until there are no pixels left.

In step 250, the green intensity value is individually analyzed. If the green intensity value is consistent with the pixel model, the system proceeds to step 260. If not, pixel (i, j) is treated as novel and the next pixel is processed until there are no pixels left.

In step 260, the blue intensity value is individually analyzed. If the blue intensity value is consistent with the pixel model, the system proceeds to step 230. If not, pixel (i, j) is treated as novel and the next pixel is processed until there are no pixels left.

Once it is determined that there are no more pixels left, the novel pixels identified in step 270 are furthered processed in step 300.

Figure 7:
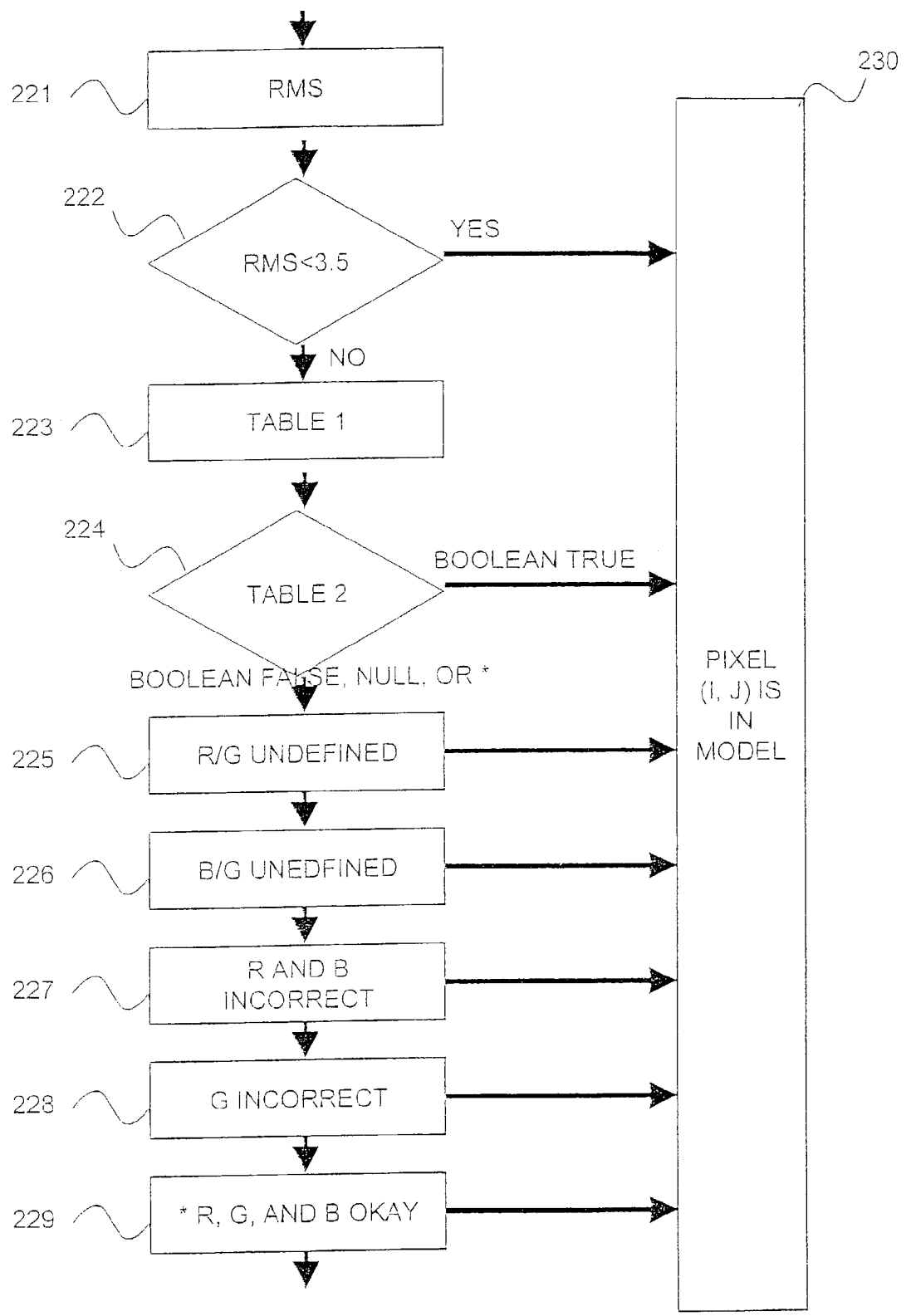
FIG. 7 is a even more detailed view of the step of background subtraction.

Referring now to FIG. 7, step 220 is described in more detail. As described above, the chromaticity of pixel (i, j) may, for example, be measured using the red-to-green and blue-to-green ratios. If this is the case, then there should be stored in pixel model (i, j) an average (and standard deviation) for these two ratios.

In step 221, the root sum square distance is calculated. That is, the red-to-green ratio of pixel (i, j) is compared with the average red-to-green ratio stored in pixel model (i, j) and the difference is measured in standard deviations. Next, the blue-to-green ratio of pixel (i, j) is compared with the average blue-to-green ratio and the difference is also measured in standard deviations. Finally, the square root of the first difference squared plus the second difference squared is calculated.

In step 222, if the root sum square mean is less than 3.5 sigma, then pixel (i, j) is consistent with the model and the system can proceed to step 230. If not, the system proceeds to step 223. As explained above, in relation to step 210, it is possible to make the system more (or less) sensitive by using a narrower or wider window of acceptable values.

In step 223, the following table (Table 1) is performed for both ratios.

TABLE 1

|  | Numerator Out of Range High | Numerator In Range | Numerator Out of Range Low |
| --- | --- | --- | --- |
| Denominator Out of Range High | Ratio Undefined (Both Low) | Ratio Approaches Zero | Ratio Approaches Zero |
| Denominator In Range | Ratio Approaches Infinity | Ratio Normal | Ratio Approaches Zero |
| Denominator Out of Range Low | Ratio Approaches Infinity | Ratio Approaches Infinity | Ratio Undefined (Both High) |

Using the red-to-green ratio as an example, if the red intensity value is out of range high and the green intensity value is in range, then the numerator is out of range high and the denominator is in range. Therefore, using the table above the ratio approaches infinity.

In step 224, the following (Table 2) is utilized with the output of Table 1 for both ratios.

TABLE 2

|  | R/G Approaches Infinity | R/G Normal | R/G Approaches Zero | R/G Undefined (Both High) | R/G Undefined (Both Low) |
| --- | --- | --- | --- | --- | --- |
| B/G Approaches Infinity | R/G <= R/G avg. and B/G <= B/G avg. | R/G within 3.5σ of R/G avg. and B/G <= B/G avg. | R/G >= R/G avg. and B/G <= B/G avg. | * | * |
| B/G Normal | R/G <= R/G avg. and B/G within 3.5σ of B/G avg. | Null | R/G >= R/G avg. and B/G within 3.5σ of B/G avg. | * | * |
| B/G Approaches Zero | R/G <= R/G avg. and B/G >= B/G avg. | R/G within 3.5σ of R/G avg. and B/G >= B/G avg. | R/G >= R/G avg. and B/G >= B/G avg. | * | * |
| B/G Undefined (Both High) | * | * | * | * | * |

TABLE 2-continued

|  | R/G Approaches Infinity | R/G Normal | R/G Approaches Zero | R/G Undefined (Both High) | R/G Undefined (Both Low) |
|---|---|---|---|---|---|
| B/G Undefined (Both Low) | * | * | * | * | * |

In the table above, there are eight Boolean statements, one null, and sixteen asterisks. In the event that there is a Boolean statement, if the Boolean statement is true, the pixel is consistent with the model and the system can proceed to step 230. Otherwise, the system should proceed to steps 225-229.

In step 225, if the red-to-green ratio of the model for pixel (i, j) is undefined, pixel (i, j) is consistent with pixel model (i, j) if the blue-to-green ratio is within 3.5 sigma of the average blue-to-green ratio. If so, the system can proceed to step 230. If not, the system should proceed to step 226.

In step 226, if the blue-to-green ratio of the model for pixel (i, j) is undefined, pixel (i, j) is consistent with pixel model (i, j) if the red-to-green ratio is within 3.5 sigma of the average red-to-green ratio. If so, the system can proceed to step 230. If not, the system should proceed to step 227.

In step 227, if the red and blue intensity values of pixel (i, j) are both incorrectly exposed in the way that they are expected to be incorrectly exposed, then pixel (i, j) is consistent with the model. In other words, if red is currently overexposed and blue is currently overexposed, and in the majority of the pixels during the training process, red was overexposed and blue was overexposed, then pixel (i, j) is consistent with the model. If so, the system can proceed to step 230. If not, the system should proceed to step 228.

In step 228, if the green intensity value of pixel (i, j) is incorrectly exposed in the way that it is expected to be incorrectly exposed, the pixel (i, j) is consistent with the model. If so, the system can proceed to step 230. If not, the system should proceed to step 229.

In step 229, if either ratio is undefined (low or high) and the red, green, and blue intensity values of pixel model (i, j) are all in there respective intensity models (as explained below), then pixel (i, j) is consistent with pixel model (i, j). If so, the system can proceed to step 230. If not, the pixel can be treated as a novel pixel or additional processing can be performed as described above.

Figure 8:
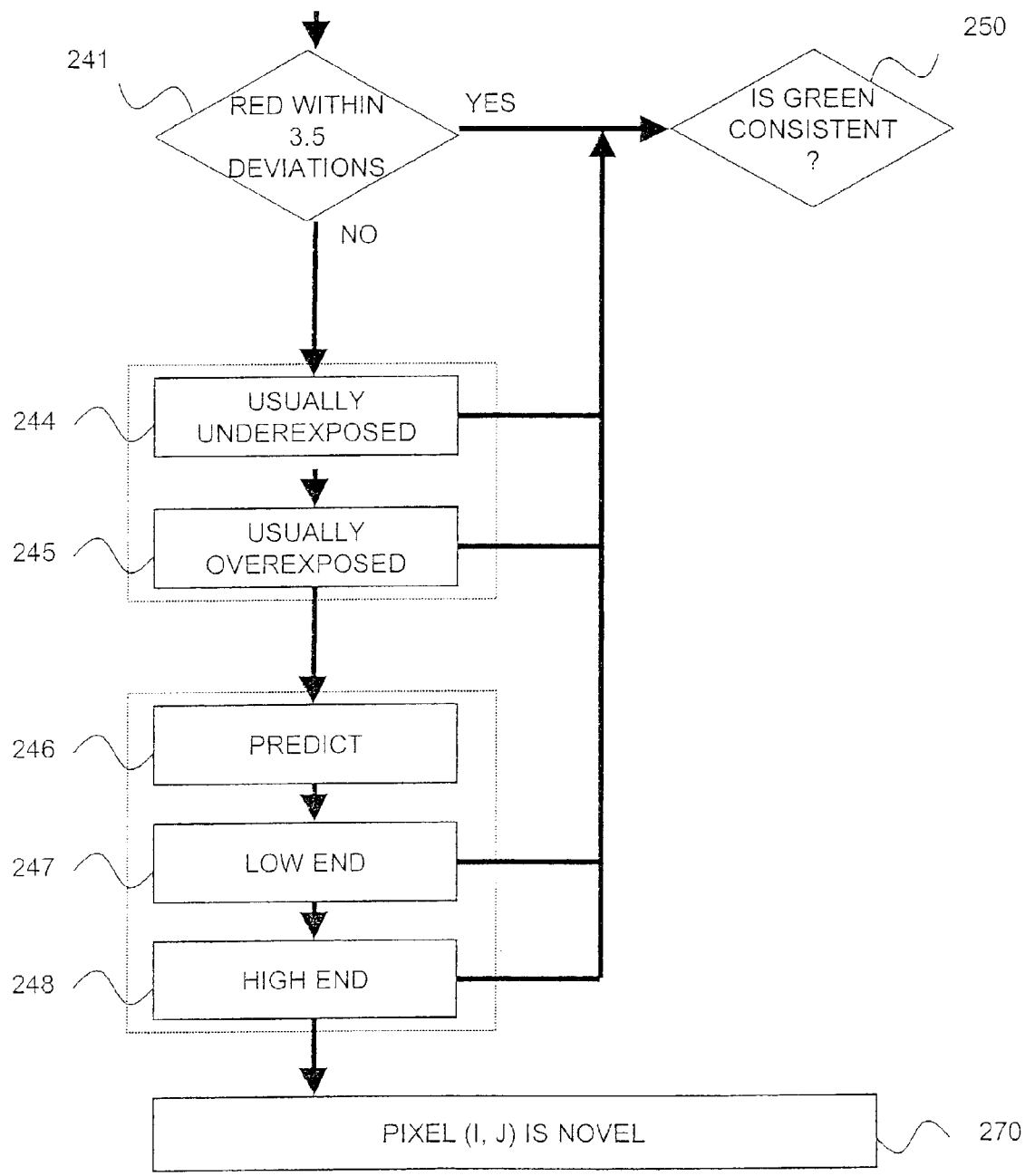
FIG. 8 is another even more detailed view of the step of background subtraction.

Referring now to FIG. 8, the step of analyzing the red intensity value 240 is described in more detail. In step 241, if the red intensity value of pixel (i, j) is within 3.5 standard deviations of the average red intensity value stored in pixel model (i, j), then the red intensity value is consistent with the model. If so, the system can proceed to step 250. If not, the system should proceed to step 244.

In steps 244 and 245, there are six inputs:
(1) the actual measured (i.e. not normalized) red intensity value of pixel (i, j) denoted "C";
(2) the actual intensity value for the underexposed threshold denoted "$C_U$";
(3) the actual intensity value for the overexposed threshold denoted "$C_O$";
(4) the number of values that were underexposed during the training period denoted "UN";
(5) the number of values that were overexposed during the training period denoted "OV"; and
(6) the number of values that were correctly exposed during the training period denoted "CE"

In step 244, which examines the case where the pixel is never correctly exposed, if CE is equal to zero, UN>OV, and C is less than or equal to $C_U$, then pixel (i, j) is consistent with pixel model (i, j). If so, the system can proceed to step 250. If not, the system should proceed to step 245.

In step 245, which also examines the case where the pixel is never correctly exposed, if CE is equal to zero, UN<OV, and C is greater than or equal to $C_O$, then pixel (i, j) is consistent with pixel model (i, j). If so, the system can proceed to step 250. If not, the system should proceed to step 246.

In steps 246-248, there are six inputs:
(1) the actual measured (i.e. not normalized) red intensity value of pixel (i, j) denoted "C";
(2) the average normalized red intensity value of pixel model (i, j) denoted "$N_{avg}$";
(3) the current exposure;
(4) the current gain;
(5) the actual intensity value for the underexposed threshold denoted "$C_U$"; and
(6) the actual intensity value for the overexposed threshold denoted "$C_O$";

In step 246, the predicted non-normalized value denoted "$C_{predict}$" is calculated using $N_{avg}$, the current exposure, and the current gain.

In step 247, which examines the low end, if C is less than or equal to $C_u$ and $C_{predict}$ is less than or equal to $C_u$ then pixel (i, j) is consistent with pixel model (i, j). If so, the system can proceed to step 250. If not, the system should proceed to step 248.

In step 248, which examines the high end, if C is greater than or equal to Co and $C_{predict}$ is greater than or equal to Co, then pixel (i, j) is consistent with pixel model (i, j). If so, the system can proceed to step 250. If not the system should proceed to step 270.

As explained above in connection with FIG. 6, if the red intensity value is individually analyzed in step 240 and determined to be consistent with the model, then the green intensity value is individually analyzed in step 250 and the blue intensity value is individually analyzed in step 260. Therefore, the process described above in connection with FIG. 8 should be repeated for the green intensity value in step 250 and the blue intensity value in step 260.

Figure 9:
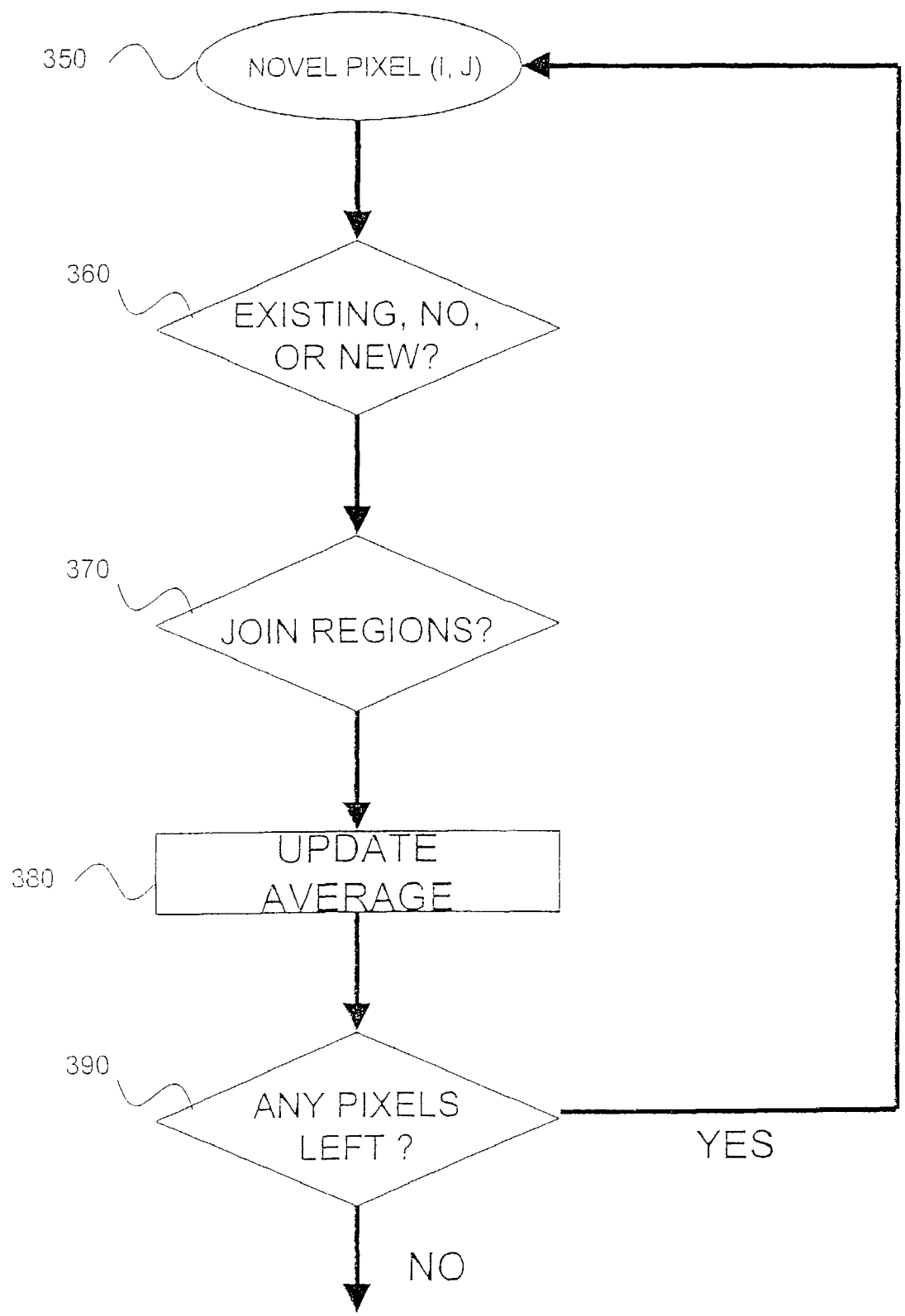
FIG. 9 is a more detailed view of one aspect of grouping novel pixels into foreground figures.

Referring now to FIG. 9, the step of getting foreground FIG. 30 is described in more detail. The novel pixels are grouped into foreground figures using a process called contiguous region detection.

In step 350, novel pixel (i, j) is selected.

In step 360, pixel (i, j) is labeled as being in an existing region, no region, or a new region.

In step 370, if two different regions are now made to be adjacent by the addition of pixel (i, j), one of the two regions is joined with the other.

In step 380, as pixel (i, j) is added to the region, the average of all the i values and the average of all the j values for all the pixels in the region is updated. The average (i, j) of the region represents an approximate location of the region.

As shown by step 390, the next pixel is processed until there are no pixels left.

According to a further embodiment, the novel pixels are grouped into foreground figures using a process called color contiguous region detection. In order to perform color contiguous region detection, it is advantageous to generate a set of color modes.

Figure 10:
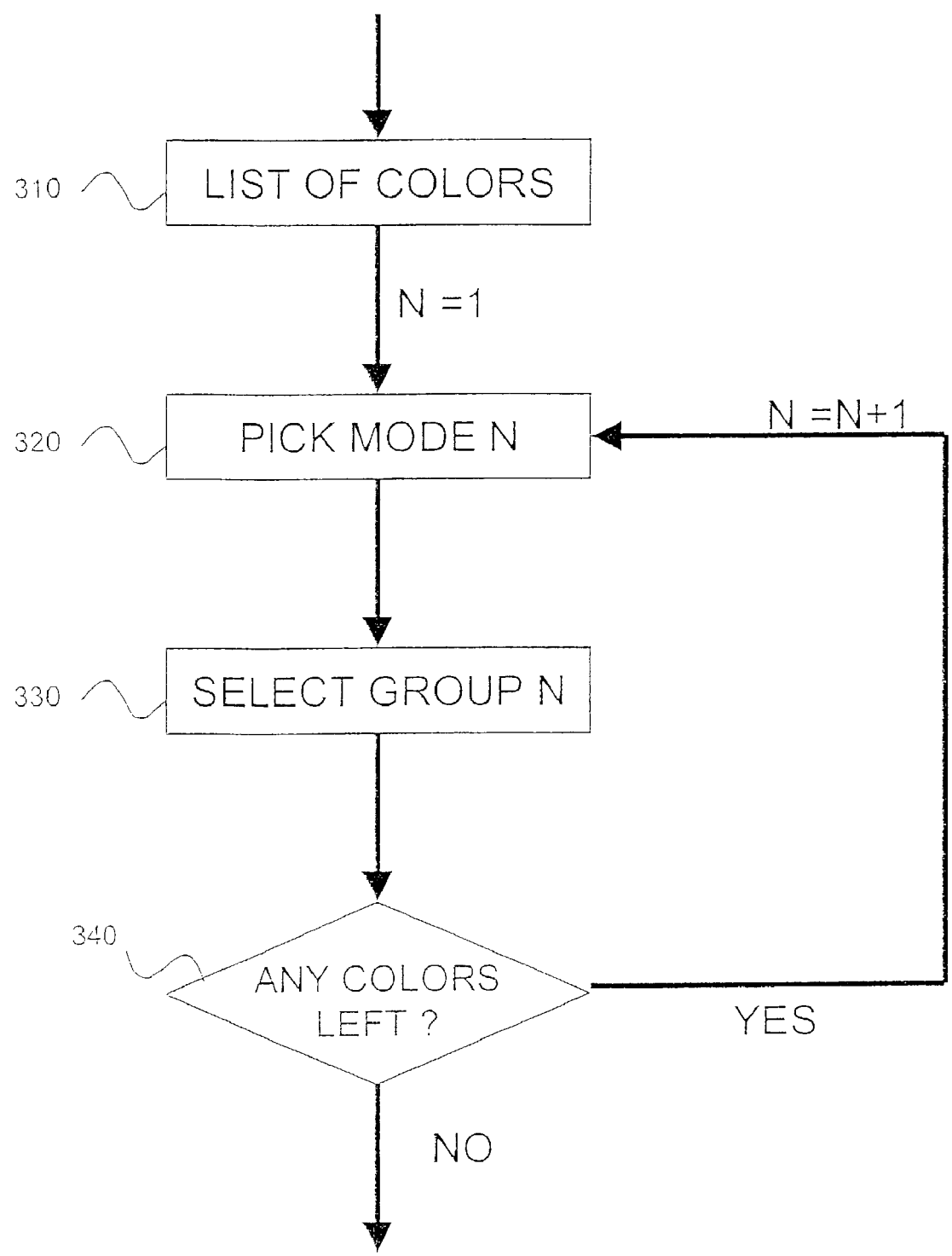
FIG. 10 is a more detailed view of another aspect of grouping novel pixels into foreground figures.

Referring now to FIG. 10, the process of generating a set of color modes is described in more detail. In step 310, a list of colors is sorted by frequency of appearance (how often a color appears in an image).

In step 320, the most frequent color is picked as the first mode.

In step 330, all pixels within a statistically significant color range from the first mode are selected to form group N.

As shown by step 340, steps 320 and 330 are repeated until there are no colors (or only infrequently occurring colors) left.

In the case of color contiguous region detection, existing regions are only joined into one region if they are of the same color mode. If two adjacent regions are different colors, they are connected as adjacent regions, rather than joined.

Referring back to FIGS. 2 and 3, the novel pixels that make up foreground FIG. 30 are either joined or connected. As regions 30a-h are joined or connected, the average (i, j) approaches the location (or pixel) indicated by the x.

As multiple cameras view the same foreground object from different angles, images can be and usually are captured at irregular intervals. As demonstrated below, it is possible to handle asynchronous, possibly out of order images.

Once the novel pixels that make up foreground FIG. 30 are either joined or connected, information such as the source camera, the time of the image, and the approximate location of the foreground figure can be packaged and placed onto a special purpose queue.

It may be advantageous to use a priority queue where priority is based on the time of the image. In order for the queue to release an image for processing, there should be a time difference between the time of the image and the current time. This time difference should account for the speed of the system. That is, the time difference should account for slower cameras, processors, or links such that an image is available from each camera before the images are released. Once images start coming out of the queue, features that have already been extracted from each image can be processed as a group of features from the same instant in time and compared to the world model.

Once the server has an average (i, j) for a given foreground figure from a first camera and an average (i, j) for the same foreground figure from a second camera, it is possible to calculate a new position estimate for the foreground figure.

The foreground figure and its known features are then compared with each of the object models in the world model. These features include, for example, the object location, object direction, object velocity, object acceleration, object size, and position estimates. If it is determined that the foreground feature and its known features match one of the object models in the world model, then the corresponding object model is updated accordingly. If on the other hand, it is determined that the foreground figure does not match any of the existing object models, a new object model is added to the world model.

It is also possible to process asynchronous, possibly out of order images without using a priority queue. Rather than delaying processing and using the delay to reorder data, it is possible to process the data as it is received. In the event that data is received out of order or the data given to the world model is older than the current state of the world model, additional processing should be performed. The world model should be reverted to the youngest state older than the data that is currently being processed. Then, the world model is updated with the data currently being processed. Then, the world model is updated in order with all the data that has already been processed. In essence, the system reverts to a previous state, makes changes, then reapplies all the changes that have been made already with the changes that have been made.

One aspect of dealing with tracking objects is the notion of a position estimate. This is a volume used to represent the estimated current position at a time n. At a later time, usually some number of milliseconds, there is a new position estimate that incorporates object velocity, acceleration, and the previous position estimate to estimate a new volume of space where that object could possibly be at the current time. This position estimate is compared in step 500 of FIG. 4 to new position estimates. When updating an object model, of which a position estimate is one feature, a new position estimate is calculated as the intersection of the current position estimate with the position estimate that is extracted from the current image. This particular method has the distinct advantage of being able to work with a system where images are collected asynchronously or synchronously and at regular or irregular intervals.

Figure 11:
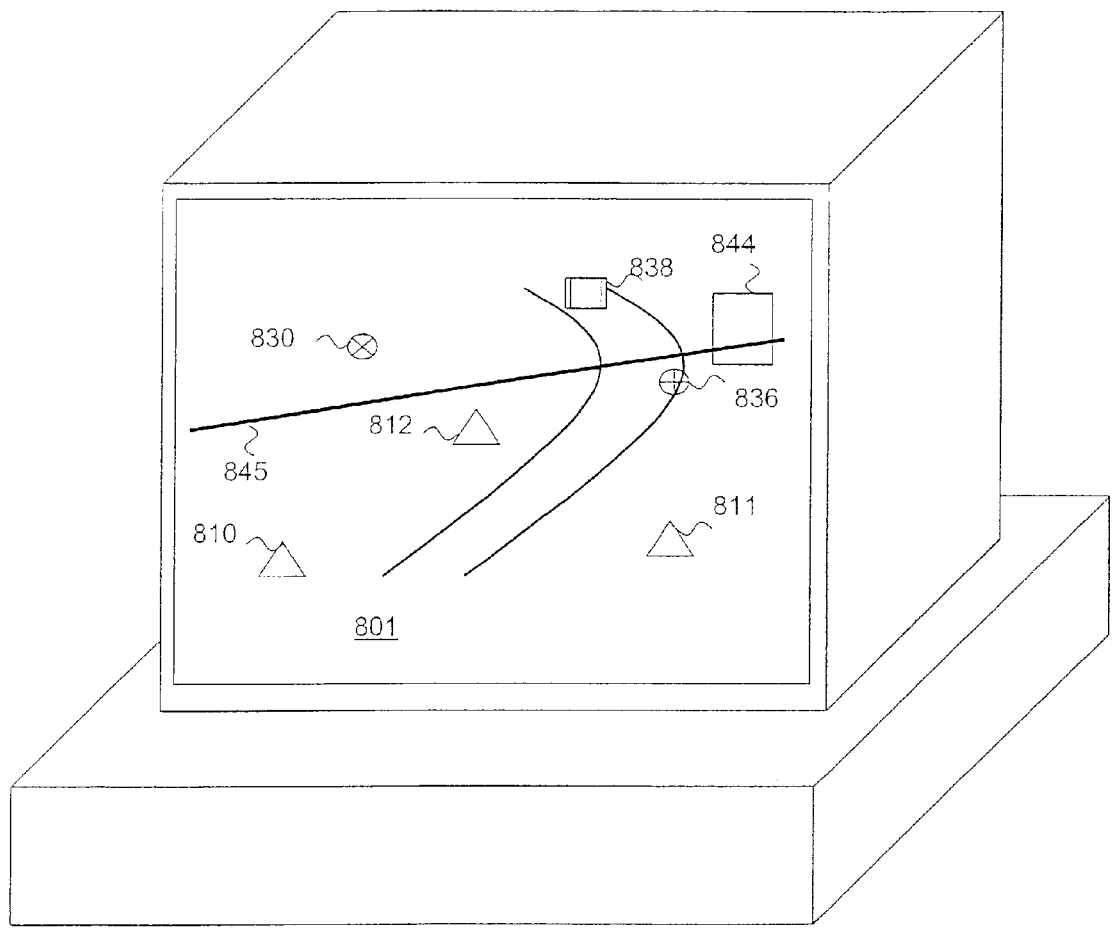
FIG. 11 is an illustration of a graphical user interface and a graphical representation of the three dimensional area.

FIG. 11 is an illustration of a graphical user interface and a graphical representation of the three dimensional area. The three dimensional area 801 is graphically represented on video interface 80. Video interface 80 allows an observer to easily survey the net effect of hundreds or thousands of cameras. The video interface 80 displays relevant reference markers such as the location of camera stations 810, 811, and 812; building 844; and country border 845. In an office setting, the video interface may, for example, display the floor layout with entrances and exits clearly marked.

Foreground FIGS. 830, 836, and 838 are graphically displayed so as to indicate their relative position. In the example, foreground FIGS. 830, 836, and 838 are an unidentified individual; an identified, authorized individual; and an automobile, respectively. A different icon, color or ID could be used for each.

If, for example, a system user wanted to manually view unidentified individual 830, the user may click on camera station 810 to view individual 830 from camera 810a. Or alternatively, the user may click on individual 830 to view individual 830 from all relevant camera angles (i.e. cameras 810a and 812a).

The system checks the location and identification of the foreground figure against a table of permissions and generates alarms based upon the location of the foreground object and the table of permissions. For example, as individual 30 approaches country border 45, a first alarm is generated. The icon 830 may blink, change color, become increasingly larger, or have some other programmed or scripted response. Audible signals or other alarm mechanisms may also be used. Also, images and/or model data may be transmitted to another location and/or saved based on alarms. If individual 30 actually crosses country border 45, additional alarms are triggered and all relevant camera angles are automatically displayed. On the other hand, as individual 36 approaches country border 45, no alarms are sounded because individual 36 is a specific identified, authorized individual.

In the case of automobile 38, alarms may or may not be triggered based upon the relative speed of automobile 38, the relative location of individual 36, the time of day, recognition of the automobile by the computer, security personnel, or electronic or other remotely sensed tag, etc. If, for example, automobile 38 is authorized to cross the border, but unidentified individual 30 enters automobile 38 after automobile 38 crosses the border, automobile 38 is demoted from authorized to unauthorized. If, for example, unidentified individuals exit automobile 38 without entering building 44, a different alarm might be triggered.

Figure 12:
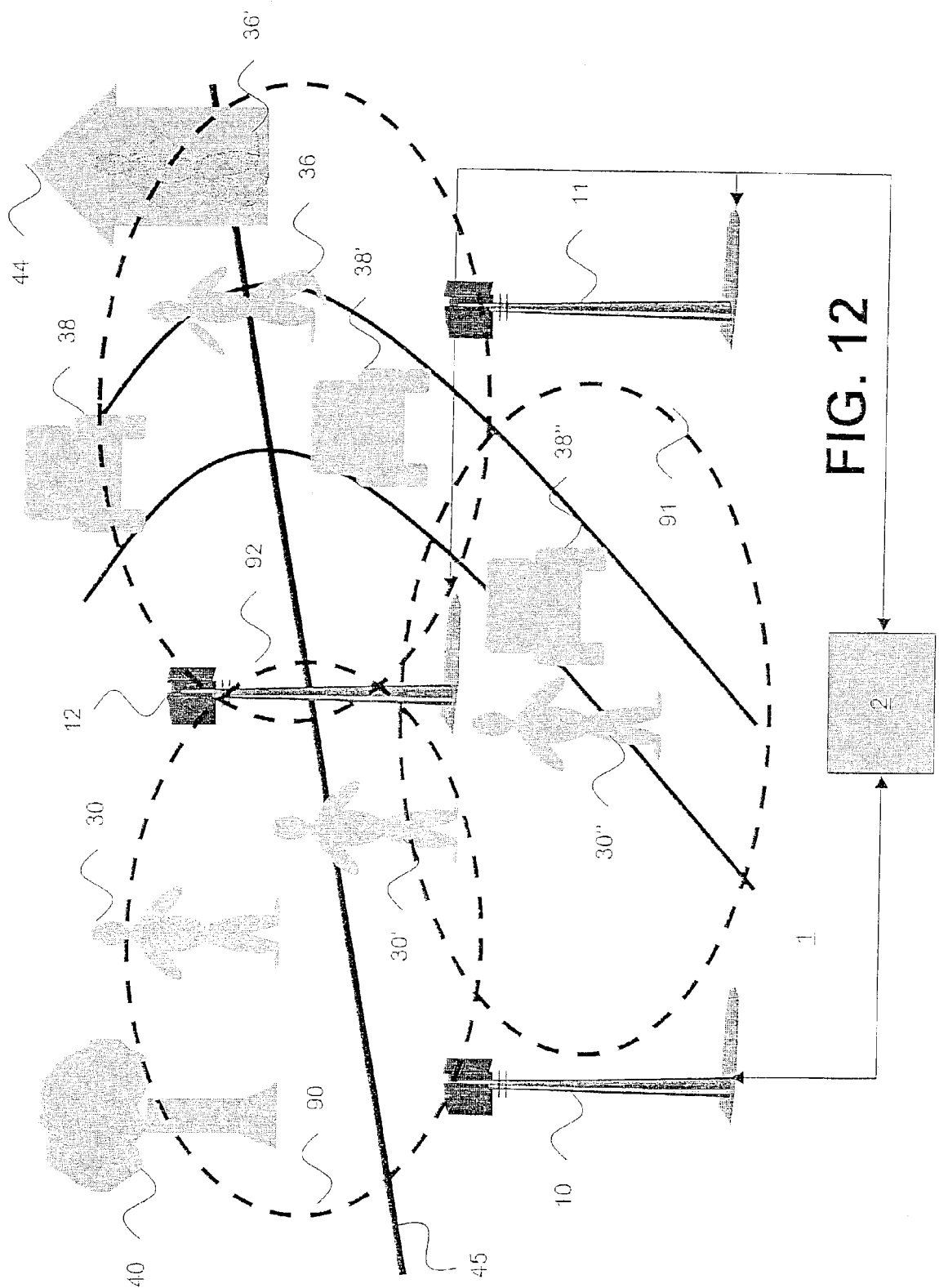
FIG. 12 is a time-lapsed illustration of a three dimensional area with video surveillance cameras arranged in a cellular format.

FIG. 12 is a time-lapsed illustration of a three dimensional area with video surveillance cameras arranged in a cellular format. As explained in connection with FIG. 1, each cell 10-12 usually contains two or three cameras, although any number of cameras may be supported per video cell 10-12.

The system works by having each cell 10-12 maintain a local object identification (id), while there is an overall global object identification (id) that is also assigned to each object. The purpose of this is to make it easy for each cell 10-12 to operate independently while maintaining a unified global identification system for client use. Each cell 10-12 tracks all the objects in its field of view independently, even where fields of view between cells overlap. In the latter case, the object is tracked in both cells contemporaneously.

Each cell 10-12 queries a server 2 to find out which cells are nearby. Alternatively, this information is provided at system startup time via a file. Cells 10-12 communicate with nearby cells by broadcasting their current state. This may be done in multiple ways. For example, each cell 10-12 opens a socket-based-client-server connection with nearby cells. When information is needed, cells 10-12 poll the nearby cells to obtain the needed information. Or alternatively, there is a "message queue" where cells 10-12 publish information on a "topic" and cells 10-12 subscribe to different "topics" as needed.

The system maintains local and global object ids. There is a data structure that contains associations between local and global ids. This data structure allows two primary operations: assert and connect. The first operation, assert, is usually performed when a new object enters a cell from outside the coverage of any cell. According to the operation assert, the new object is assigned a global id and a local id that are the same. In other words, an assertion is made that the global id and the local id are the same.

According to the operation connect, two objects from different cells are given the same global id. In other words, two objects from different cells are connected. The two objects are connected when the features from one object in a cell is determined to have enough similar features to and is within the position estimate of an object from another cell. The system is designed to check to make sure it does not make contradictory assertions or connections.

According to a particular embodiment, each exit/entry point of the surveillance area is defined as either a closed area entry point or an open area entry point. A closed area entry point occurs when there is only one exit from a closed area. An example of a closed area entry point is a closet door. When an object enters a closet, the object is assumed to remain in the closet until the object reemerges. When an object exits the closet, the object is matched (i.e. connected) with an object that previously entered the closet.

An example of an open area entry point is any entry point that does not follow the properties of a closed area entry point. An example of a closed area entry point is the front lobby of a office building. When an employee walks through the front lobby to go to lunch, the employee may or may not return through the front lobby. Therefore, when an object enters the front lobby, the object is checked against objects that previously exited the front lobby. In some cases, the objected is connected with a known object. In other cases, the objected is treated as a new object.

According to another embodiment, the system builds a cyclical graph of all the areas under surveillance. The system notes "world exit/entry" points on the graph by adding an "out-of-world" node. The system connects all nodes with world exits to the "out-of-world" node. The "out-of-world" node represents all the areas outside of the area of surveillance that are not bound by any constraints.

When building the graph, nodes must be added for areas that are outside of the area of surveillance, but have constraints. For example, there may be a section of a hallway that has two entry/exit points. This "out-of-coverage" area is represented as a node in the graph with edges connecting it to the two areas to which it is adjacent.

This graph allows for a great deal of reasoning about who is where, and it simplifies the tracking process by limiting the number possibilities for object mislabeling. Essentially, as an object moves out of view, it is placed not on a simple list of untracked objects, but on a list of objects in a certain "out of view" area.

When an object comes back into view, it is checked against the graph. Specifically, each area in the world has a corresponding graph node associated with it. When an object comes into an area like this, in order to maintain a cohesive label on an object as it passes through the area, the "out-of-view" list is checked for that specific section of the graph.

Using FIG. 12 as an example, cells 10-12 are treated as open area entry points with the exception that building 44 is treated as a closed area entry point. When object 30 enters cell 90, object 30 is assigned a local and a global object id. Because cell 90 is an open area entry point, object 30 is checked against a list of known objects. Because object 30 is a new object, object 30 is assigned a new global id and a new local id, where the global id and the local id are the same.

Similarly when object 38 enters cell 92, object 32 is checked against a list of known objects. Because object 38 is a new object, object 38 is assigned a new global id and a new local id, where the global id and the local id are the same. However, when object 36 emerges from closed area entry point 44, object 36 is matched with a known object and reassigned its old global id and old local id.

As object 30 moves within cell 90, its position and features are updated. As object 30' leaves cell 90, the server 2 accounts for the approximate position of object 30' and notifies adjacent cells 91 and 92 of the expected arrival of object 30'. Similarly, as object 38' moves within cell 92, its position and features are updated. As object 38' leaves cell 92, the server 2 accounts for the approximate position of object 38' and notifies adjacent cells 90 and 92 of the expected arrival of object 38'. However, when object 36'enters closed area 44, there is no need to notify adjacent cells 90 and 92. Object 36' is assumed to remain in closed area 44 until object 36' reemerges.

When object 30" enters cell 92, it is treated as a new foreground object and assigned a new local and global id. Once features are extracted from object 30" and it is determined that object 30" is the same object as object 30, the two objects are connected and given the same global id. Similarly, when object 38" enters cell 92, it is treated as a new foreground object and assigned a new local and global id. Once features are extracted from object 38" and it is determined that object 38" is the same object as object 38, the two objects are connected and give the same global id. If object 30" enters object 38", object 38" may be treated as a closed area entry point and objects 30" and 38" may be associated and tracked and maintained as a joint object. However, should object 38" pass out of view of camera stations 10 and 11, objects 30" and 38" should be disassociated to account for the possibility that object 30" exited object 38" while out of view of the camera stations.

While the foregoing description makes reference to particular illustrative embodiments, these examples should not be construed as limitations. It will be evident to those skilled in the art that the disclosed invention can be used in other embodiments. Thus, the present invention is not limited to the disclosed embodiments, but is to be accorded the widest scope consistent with the claims below.

What is claimed is:

1. A method for video surveillance, the method comprising the following steps:
    storing video data, in a physical computer readable medium, for at least two images at more than one exposure time;
    analyzing, in a computer, the video data for the at least two images at more than one exposure time to create a pixel model for each pixel in the at least two images;
    storing video data, in a physical computer readable medium, for a current image at a current exposure time; and
    comparing, in a computer, each pixel of said current image with a corresponding pixel model so as to detect novel pixels.

2. A method according to claim 1, the method further comprising the step of grouping the novel pixels into foreground figures.

3. A method according to claim 2, wherein the step of grouping the novel pixels into foreground figures comprises the following steps:
    labeling a pixel as being in an existing region, no region, or a new region; and
    joining two regions if the addition of the pixel makes the two regions adjacent;
    and calculating the average grid location of the pixels in each region.

4. A method according to claim 2, the method further comprising the step of extracting features from said foreground figure.

5. A method according to claim 4, the method further comprising the step of comparing said features with object models in a world model.

6. A method according to claim 4, wherein the step of grouping the novel pixels into foreground figures comprises the following steps:
    generating a list of colors; and
    sorting the colors by frequency of appearance; and grouping the pixels based upon the list of colors.

7. A method according to claim 6, wherein the step of grouping the novel pixels into foreground figures comprises the following steps:
    labeling a pixel as being in an existing region, no region, or a new region; and
    joining two regions if the addition of the pixel makes the two regions adjacent and the regions are the same color.

8. A method according to claim 7, wherein the step of grouping the novel pixels into foreground figures further comprises the step of connecting two regions if the addition of the pixel makes the two regions adjacent and the regions are not the same color.

9. A method according to claim 8, wherein the step of grouping the novel pixels into foreground figures further comprises the step of calculating the average grid location of the pixels in each region.

10. A method according to claim 5, the method further comprising the step of determining whether to update one of the object models or add an object model to the world model.

11. A method according to claim 1, wherein the video data comprises intensity data and chromaticity data.

12. A method according to claim 11, wherein the intensity data comprises red, green, and blue intensities for each pixel.

13. A method according to claim 12, wherein the chromaticity data comprises the ratio of the red intensity to the green intensity for each pixel.

14. A method according to claim 13, wherein the chromaticity data further comprises the ratio of the blue intensity to the green intensity for each pixel.

15. A method according to claim 1, wherein the step of storing video data for at least two images comprises the following steps:
    storing video data for a plurality of images at a minimum exposure time;
    storing video data for a plurality of images at a plurality of intermediate exposure times; and
    storing video data for a plurality of images at a maximum exposure time.

16. A method according to claim 15, wherein the plurality of intermediate exposure times are equally spaced between the minimum exposure time and the maximum exposure time.

17. A method according to claim 15, wherein the number of images stored at the minimum exposure time is greater than the number of exposures stored at any of the intermediate exposure times.

18. A method according to claim 15, further comprising the step of selecting a best exposure time.

19. A method according to claim 18, the current exposure time equal to the best exposure time.

20. A method according to claim 1, further comprising the step of normalizing the video data for the current image for exposure time.

21. A method according to claim 1, further comprising the step of storing video data for a current image at a current exposure time and gain setting.

22. A method according to claim 21, further comprising the step of normalizing the video data for the current image for exposure time and gain setting.

23. A method according to claim 1, wherein the step of analyzing the video data comprises the step of counting the number of times that each pixel in the at least two images is underexposed.

24. A method according to claim 23, wherein the step of analyzing the video data further comprises the step of counting the number of times that each pixel in the at least two images is overexposed.

25. A method according to claim 24, wherein the step of analyzing the video data further comprises the step of counting the number of times that each pixel in the at least two images is correctly exposed.

26. A method according to claim 25, wherein the step of analyzing the video data further comprises the step of saving video data in the pixel model if the pixel is correctly exposed.

27. A method according to claim 26, wherein the step of analyzing the video data further comprises the step of calculating an average for the video data in the pixel model.

28. A method according to claim 27, wherein the step of analyzing the video data further comprises the step of calculating a standard deviation for the video data in the pixel model.

29. A method according to claim 1, the video data comprising red, green, and blue intensities.

30. A method according to claim 29, wherein the step of analyzing the video data comprises the step of calculating an average red intensity, an average green intensity, and an average blue intensity.

31. A method according to claim 29, wherein the step of analyzing the video data comprises the step of saving red, green, and blue intensities in the pixel models.

32. A method according to claim 31, wherein the step of analyzing the video data further comprises the step of calculating an average red intensity, an average green intensity, and an average blue intensity for the red, green, and blue intensities in each pixel model.

33. A method according to claim 32, wherein the step of comparing comprises the steps of:
calculating the sum of the red, green, and blue intensities in each pixel model;
calculating the sum of the red, green, and blue intensities for each pixel in the current image; and
comparing the sum for each pixel in the current image with the sum for the corresponding pixel model.

34. A method according to claim 33, wherein the step of analyzing the video data further comprises the step of saving chromaticity data in the pixel model.

35. A method according to claim 34, wherein the step of comparing further comprises the step of comparing the chromaticity of a pixel in the current image with the chromaticity data saved in a corresponding pixel model.

36. A method according to claim 35, wherein the step of comparing further comprises the step of treating said pixel as in said pixel model if the chromaticity of said pixel is consistent with said chromaticity data.

37. A method according to claim 35, wherein the step of comparing further comprises the step of comparing the red intensity of said pixel in the current image with red intensity data saved in said corresponding pixel model.

38. A method according to claim 37, wherein the step of comparing further comprises the step of treating said pixel as novel if the red intensity is inconsistent with the red intensity data saved in said corresponding pixel model.

39. A method according to claim 38, wherein the step of comparing further comprises the step of comparing the green intensity of said pixel in the current image with green intensity data saved in said corresponding pixel model.

40. A method according to claim 39, wherein the step of comparing further comprises the step of treating said pixel as novel if the green intensity is inconsistent with the green intensity data saved in said corresponding pixel model.

41. A method according to claim 40, wherein the step of comparing further comprises the step of comparing the blue intensity of said pixel in the current image with blue intensity data saved in said corresponding pixel model.

42. A method according to claim 41, wherein the step of comparing further comprises the step of treating said pixel as novel if the blue intensity is inconsistent with the blue intensity data saved in said corresponding pixel model.

43. A method according to claim 42, wherein the step of comparing further comprises the step of treating said pixel as in said pixel model if the blue intensity is consistent with the blue intensity data saved in said corresponding pixel model.

44. A method according to claim 30, the video data further comprising the ratio of the red intensity to the green intensity.

45. A method according to claim 44, wherein the step of analyzing the video data further comprises the step of calculating an average ratio of the red intensity to the green intensity.

46. A method according to claim 45, the video data further comprising the ratio of the blue intensity to the green intensity.

47. A method according to claim 46, wherein the step of analyzing the video data further comprises the step of calculating an average ratio of the blue intensity to the green intensity.

48. A method according to claim 1, wherein the step of analyzing the video data comprises the step of saving video data in the pixel model.

49. A method according to claim 48, wherein the step of analyzing the video data further comprises the step of calculating an average for the video data in the pixel model.

50. A method according to claim 49, wherein the step of analyzing the video data further comprises the step of adjusting the average if the average is near an underexposed threshold.

51. A method according to claim 50, wherein the step of analyzing the video data further comprises the step of adjusting the average if the average is near an overexposed threshold.

52. A method according to claim 49, wherein the step of analyzing the video data further comprises the step of calculating a standard deviation for the video data in the pixel model.

53. A method according to claim 1, wherein the step of analyzing the video data comprises the step of saving first color ratios and second color ratios in the pixel models.

54. A method according to claim 53, wherein the step of comparing comprises the following steps:
determining whether the numerator of a first color ratio of a pixel in the current image is incorrectly exposed;
determining whether the numerator of a second color ratio of a pixel in the current image is incorrectly exposed; and
treating the pixel as in the model if the numerator of the first color ratio is incorrectly exposed in the way that it was expected to be incorrectly exposed and the numerator of the second color ratio is incorrectly exposed in the way that it was expected to be incorrectly exposed.

55. A method according to claim 53, wherein the step of comparing comprises the following steps:
determining whether the denominator of a first color ratio and a second color ratio of a pixel in the current image is incorrectly exposed; and
treating the pixel as in the model if the denominator is incorrectly exposed in the way that it was expected to be incorrectly exposed.

56. A method according to claim 1, wherein the step of analyzing the video data comprises the step of saving a color intensity in the pixel models.

57. A method according to claim 56, wherein the step of analyzing the video data further comprises the step of calculating the average color intensity for the color intensities in each pixel model.

58. A method according to claim 57, wherein the step of comparing comprises the step of comparing the color intensity for a pixel in the current image with the average color intensity for the corresponding pixel model.

59. A method according to claim 56, wherein the step of comparing comprises the following steps:
determining whether a pixel in the current image was ever correctly exposed;
determining whether the number of values that were underexposed is greater than the number of values that were overexposed; and
determining whether the color intensity of the pixel in the current image is less than or equal to the color intensity of the underexposed threshold.

60. A method according to claim 59, wherein the step of comparing further comprises the following steps:
- determining whether the number of values that were overexposed is greater than the number of values that were underexposed; and
- determining whether the color intensity of the pixel in the current image is greater than or equal to the color intensity of the overexposed threshold.

61. A method according to claim 56, wherein the step of comparing comprises the following steps:
- calculating the predicted color intensity for a pixel in the current image; and
- determining whether the color intensity of the pixel in the current image is less than or equal to the color intensity for the underexposed threshold; and
- determining whether the predicted color intensity for the pixel in the current image is less than or equal to the color intensity for the underexposed threshold.

62. A method according to claim 61, wherein the step of comparing further comprises:
- determining whether the color intensity of the pixel in the current image is greater than or equal to the color intensity for the overexposed threshold; and
- determining whether the predicted color intensity for the pixel in the current image is greater than or equal to the color intensity for the overexposed threshold.

63. A method according to claim 53, wherein the step of analyzing the video data further comprises the step of calculating an average first color ratio and an average second color ratio for the first color ratios and second color ratios in each pixel model.

64. A method according to claim 63, wherein the step of comparing comprises:
- calculating a first difference between the first color ratio of a pixel in the current image and the average first color ratio in a corresponding pixel model in standard deviations;
- calculating a second difference between the second color ratio of said pixel and the average second color ratio in said corresponding pixel model in standard deviations; and
- calculating the square root of the sum of first difference squared and the second difference squared.

65. A method according to claim 63, wherein the step of comparing comprises the step of determining whether the first color ratio is normal, undefined, approaches zero, or approaches infinity.

66. A method according to claim 65, wherein the step of comparing further comprises the step of determining whether the second color ratio is normal, undefined, approaches zero, or approaches infinity.

67. A method according to claim 66, wherein the step of comparing further comprises the step of selecting a Boolean statement based upon whether the first color ratio is normal, approaches zero, or approaches infinity and whether the second color ratio is normal, approaches zero, or approaches infinity.

68. A method according to claim 67, where the Boolean statement involves comparing the first color ratio with the average first color ratio and comparing the second color ratio with the average second color ratio.

69. A method according to claim 68, wherein the step of comparing further comprises the step of comparing the second color ratio with the average second color ratio if the first color ratio is undefined.

70. A method according to claim 69, wherein the step of comparing further comprises the step of comparing the first color ratio with the average first color ratio if the second color ratio is undefined.

71. A method for video surveillance, the method comprising the following steps:
- storing video data, in a physical computer readable medium, for at least two images at more than one exposure time;
- analyzing, in a computer, the video data for the at least two images at more than one exposure time to create a pixel model for each pixel in the at least two images;
- storing video data, in a physical computer readable medium, for a current image at a current exposure time; and
- comparing, in a computer, each pixel of said current image with a corresponding pixel model so as to detect novel pixels, wherein the step of storing video data for at least two images comprises the following steps:
- storing video data for a plurality of images at a minimum exposure time;
- storing video data for a plurality of images at a plurality of intermediate exposure times; and
- storing video data for a plurality of images at a maximum exposure time,
- wherein the number of images stored at the minimum exposure time is greater than the number of exposures stored at any of the intermediate exposure times
- wherein the number of images stored at the maximum exposure time is greater than the number of exposures stored at any of the intermediate exposure times.

72. A method for video surveillance, the method comprising the following steps:
- storing video data, in a physical computer readable medium, for at least two images at more than one exposure time;
- analyzing, in a computer, the video data for the at least two images at more than one exposure time to create a pixel model for each pixel in the at least two images;
- storing video data, in a physical computer readable medium, for a current image at a current exposure time; and
- comparing, in a computer, each pixel of said current image with a corresponding pixel model so as to detect novel pixels, wherein the step of storing video data for at least two images comprises the following steps:
- storing video data for a plurality of images at a minimum exposure time;
- storing video data for a plurality of images at a plurality of intermediate exposure times; and
- storing video data for a plurality of images at a maximum exposure time,
- wherein the number of images stored at the minimum exposure time is greater than the number of exposures stored at any of the intermediate exposure times
- wherein the step of analyzing the video data comprises the step of saving video data in the pixel model,
- wherein the step of analyzing the video data further comprises the step of calculating an average for the video data in the pixel mode,
- wherein the step of analyzing the video data further comprises the step of calculating a standard deviation for the video data in the pixel model, and
- wherein the step of analyzing the video data further comprises the step of adjusting the average if the sum of the average and the product of a constant and the standard deviation is less than the sum of an underexposed threshold and the product of the constant and a predetermined standard deviation.

73. A method according to claim 72, wherein the step of analyzing the video data further comprises the step of adjusting the average if the difference of the average and the product of the constant and the standard deviation is greater than the difference of an overexposed threshold and the product of the constant and the predetermined standard deviation.

* * * * *